United States Patent
Kim et al.

(10) Patent No.: US 10,934,601 B2
(45) Date of Patent: Mar. 2, 2021

(54) PLATED STEEL SHEET FOR HOT PRESS FORMING HAVING EXCELLENT IMPACT PROPERTY, HOT PRESS FORMED PART, AND MANUFACTURING METHOD THEREOF

(71) Applicant: POSCO, Pohang-si (KR)

(72) Inventors: Seong-Woo Kim, Gwangyang-si (KR); Jin-Keun Oh, Gwangyang-si (KR); Yeol-Rae Cho, Gwangyang-si (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 16/470,762

(22) PCT Filed: Dec. 15, 2017

(86) PCT No.: PCT/KR2017/014843
§ 371 (c)(1),
(2) Date: Jun. 18, 2019

(87) PCT Pub. No.: WO2018/117543
PCT Pub. Date: Jun. 28, 2018

(65) Prior Publication Data
US 2020/0087747 A1    Mar. 19, 2020

(30) Foreign Application Priority Data
Dec. 23, 2016 (KR) .................. 10-2016-0178236

(51) Int. Cl.
*C21D 9/46* (2006.01)
*B32B 15/01* (2006.01)
(Continued)

(52) U.S. Cl.
CPC .............. *C21D 9/46* (2013.01); *B32B 15/012* (2013.01); *C21D 6/002* (2013.01); *C21D 6/005* (2013.01);
(Continued)

(58) Field of Classification Search
None
See application file for complete search history.

(56) References Cited

U.S. PATENT DOCUMENTS 6,296,805 B1 * 10/2001 Laurent ................ C21D 8/0278
148/531
2011/0165436 A1   7/2011 Drillet et al.
(Continued)

FOREIGN PATENT DOCUMENTS

JP    2006037130    2/2006
JP    2010043323    2/2010
(Continued)

OTHER PUBLICATIONS

European Search Report—European Application No. 17883493.3, dated Dec. 6, 2019, citing US 2016/362763.
(Continued)

*Primary Examiner* — Daniel J. Schleis
(74) *Attorney, Agent, or Firm* — Cantor Colburn LLP

(57) ABSTRACT

Provided is a plated steel sheet for hot press forming, having an excellent impact property, including: a base steel sheet comprising, by wt %, 0.15-0.4% of C, 0.05-1.0% of Si, 0.6-3.0% of Mn, 0.001-0.05% of P, 0.0001-0.02% of S, 0.01-0.1% of Al, 0.001-0.02% of N, 0.001-0.01% of B, 0.01-0.5% of Cr, 0.01-0.05% of Ti, and the balance of Fe and inevitable impurities; and an Al—Si plated layer formed on the surface of the base steel sheet. A thickness of a carbon-depleted layer in a surface layer part of the base steel sheet is 5 μm or less. The surface layer part means a region from the surface of the base steel sheet to a depth of 200 μm, and the carbon-depleted layer means a region which the carbon content is 50% or less of an average carbon amount ($C_0$) of the base steel sheet.

6 Claims, 2 Drawing Sheets

(51) Int. Cl.
| | |
|---|---|
| *C21D 6/00* | (2006.01) |
| *C21D 8/02* | (2006.01) |
| *C22C 21/02* | (2006.01) |
| *C22C 38/00* | (2006.01) |
| *C22C 38/02* | (2006.01) |
| *C22C 38/06* | (2006.01) |
| *C22C 38/22* | (2006.01) |
| *C22C 38/24* | (2006.01) |
| *C22C 38/26* | (2006.01) |
| *C22C 38/28* | (2006.01) |
| *C22C 38/32* | (2006.01) |
| *C22C 38/38* | (2006.01) |
| *C23C 2/12* | (2006.01) |
| *C23C 2/40* | (2006.01) |

(52) U.S. Cl.
CPC ............ *C21D 6/008* (2013.01); *C21D 8/0205* (2013.01); *C21D 8/0226* (2013.01); *C22C 21/02* (2013.01); *C22C 38/001* (2013.01); *C22C 38/002* (2013.01); *C22C 38/02* (2013.01); *C22C 38/06* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C23C 2/12* (2013.01); *C23C 2/40* (2013.01); *C21D 2211/001* (2013.01); *C21D 2211/005* (2013.01); *C21D 2211/008* (2013.01); *C21D 2211/009* (2013.01); *Y10T 428/12757* (2015.01)

(56) References Cited

U.S. PATENT DOCUMENTS

| | | | |
|---|---|---|---|
| 2016/0017452 | A1 | 1/2016 | Puerta Velasquez et al. |
| 2016/0362763 | A1* | 12/2016 | Oh .......................... C23C 2/26 |

FOREIGN PATENT DOCUMENTS

| | | |
|---|---|---|
| JP | 2014118628 | 6/2014 |
| KR | 100723157 | 5/2007 |
| KR | 20090070150 | 7/2009 |
| KR | 20090086970 | 8/2009 |
| KR | 20100001335 | 1/2010 |
| KR | 20100047011 | 5/2010 |
| KR | 20150047627 | 5/2015 |
| KR | 101569508 | * 11/2015 |
| KR | 20160078852 | 7/2016 |
| WO | 2009082091 | 7/2009 |

OTHER PUBLICATIONS

International Search Report—PCT/KR2017/014843 dated Mar. 30, 2018.
Japanese Office Action—Japanese Application No. 2019-533548 dated Sep. 1, 2020, citing US 2016/362763, JP 2006-037130, and JP 2014-118628.

* cited by examiner

PLATED STEEL SHEET FOR HOT PRESS FORMING HAVING EXCELLENT IMPACT PROPERTY, HOT PRESS FORMED PART, AND MANUFACTURING METHOD THEREOF

TECHNICAL FIELD

The present disclosure relates to a plated steel sheet for hot press forming, a hot press formed part, and manufacturing method thereof, having excellent impact properties, applicable to automotive components requiring impact resistance properties.

BACKGROUND ART

Recently, a hot press formed part, having high strength, has been applied to automotive structural members to achieve improvements in fuel efficiency, protection of passengers, and like this, through weight reduction of automobiles.

A representative technology, relating to such a hot press molding member, is disclosed in Patent Document 1. According to Patent Document 1, an Al—Si plated steel sheet is heated to 850° C. or higher and then hot press formed and quenched by a press, and a structure of the member can be formed into martensite. Therefore, it is possible to secure an ultra-high strength property with a tensile strength of 1600 MPa or more, thereby easily achieve a light weight of the automobile.

However, according to Patent Document 1, an impact property against impact is relatively deteriorated due to high strength. In certain cases, an abnormally low impact property is exhibited depending on a hot press forming condition. Accordingly, there was an increasing demand for development of a hot press formed member having excellent impact properties.

Patent Document 2 proposes a technology to improve an impact property after hot press forming, which is achieved by adjusting a ratio of calcium to sulfur (Ca/S) to spheroidize an inclusion and adding an alloying element such as niobium (Nb) to achieve grain refinement.

However, Patent Document 2, disclosing inclusion control and grain size control for improving an impact property of a typical iron material, is estimated to have difficulty in improving a low impact property occurring in actual hot press forming.

Accordingly, there is a demand for development of a plated steel sheet for hot press forming, a hot press formed part, and manufacturing method thereof, having excellent impact properties.

PRIOR ART DOCUMENT (Patent Document 1) U.S. Pat. No. 6,296,805
(Patent Document 2) Korea Patent Publication No. 10-2010-0047011

DISCLOSURE

Technical Problem

An aspect of the present disclosure is to provide a plated steel sheet for hot press forming having excellent impact properties, a hot press formed part using the plated steel sheet for hot press forming, and a manufacturing method thereof.

Aspects of the present disclosure are not limited to the above-mentioned aspects. The above-mentioned aspects and other aspects of the present disclosure will be clearly understood by those skilled in the art through the following description.

Technical Solution

According to an aspect of the present disclosure, a plated steel sheet for hot press forming, having an excellent impact property, comprises a base steel sheet comprising, by wt %, 0.15-0.4% of C, 0.05-1.0% of Si, 0.6-3.0% of Mn, 0.001-0.05% of P, 0.0001-0.02% of S, 0.01-0.1% of Al, 0.001-0.02% of N, 0.001-0.01% of B, 0.01-0.5% of Cr, 0.01-0.05% of Ti, and the balance of Fe and inevitable impurities, and an Al—Si plated layer formed on the surface of the base steel sheet. The thickness of a carbon-depleted layer in a surface layer part of the base steel sheet is 5 μm or less. The surface layer part means a region from the surface of the base steel sheet to a depth of 200 μm, and the carbon-depleted layer means a region which the carbon content is 50% or less of an average carbon amount ($C_0$) of the base steel sheet.

According to another aspect of the present disclosure, a manufacturing method of a plated steel sheet for hot press forming, having excellent impact properties, comprises heating a slab, comprising, by wt %, 0.15-0.4% of C, 0.05-1.0% of Si, 0.6-3.0% of Mn, 0.001-0.05% of P, 0.0001-0.02% of S, 0.01-0.1% of Al, 0.001-0.02% of N, 0.001-0.01% of B, 0.01-0.5% of Cr, 0.01-0.05% of Ti, and the balance of Fe and inevitable impurities, to a temperature of 1050 to 1300° C., performing finishing hot-rolling on the heated slab to a temperature of 800 to 950° C. to obtain a hot-rolled steel sheet, stating cooling the hot-rolled steel sheet within 30 seconds of performing the finishing hot-rolling and winding the hot-rolled steel sheet at a temperature of 450 to 750° C., heating the wound hot-rolled steel sheet to a temperature of 740 to 860° C. and annealing in an atmosphere having a dew point temperature of −70 to −30° C., and plating the annealed hot-rolled steel sheet by dipping in an Al—Si plating bath.

According to an aspect of the present disclosure, a hot press formed part comprises a base material including, by wt %, 0.15-0.4% of C, 0.1-1.0% of Si, 0.6-3.0% of Mn, 0.001-0.05% of P, 0.0001-0.02% of S, 0.01-0.1% of Al, 0.001-0.02% of N, 0.001-0.01% of B, 0.01-0.5% of Cr, 0.01-0.05% of Ti, and the balance of Fe and inevitable impurities, and an Al—Si plated layer formed on a surface of the base material. A carbon-enriched layer is formed in a surface layer part of the base material. The surface layer part means a region from the surface of the base material to a depth of 200 μm, and the carbon-enriched layer means a region which the carbon content is 110% or more of an average carbon amount ($C_0$) of the base material.

According to another aspect of the present disclosure, a manufacturing method of a hot press formed part comprises a heating a plated steel sheet, manufactured by the manufacturing method of a plated steel sheet for hot press forming according to the present disclosure, to a temperature ranging from an Ac3 temperature to 980° C. and maintaining for 1 to 1000 seconds, and a hot press forming the heated plated steel sheet by a press while cooling a martensite transformation finish temperature (Mf) or less at a cooling rate of 1 to 1000° C./sec.

In addition, the above-mentioned technical solution does not list all the features of the present disclosure. The various features of the present disclosure, advantages and effects thereof can be understood in more detail with reference to the following specific embodiments.

Advantageous Effects

As set forth above, example embodiments in the present disclosure may provide a plated steel sheet for hot press forming, a hot press formed part using the plated steel sheet for hot press forming, and manufacturing method thereof, having excellent impact properties.

BEST MODE FOR INVENTION

Figure 1:
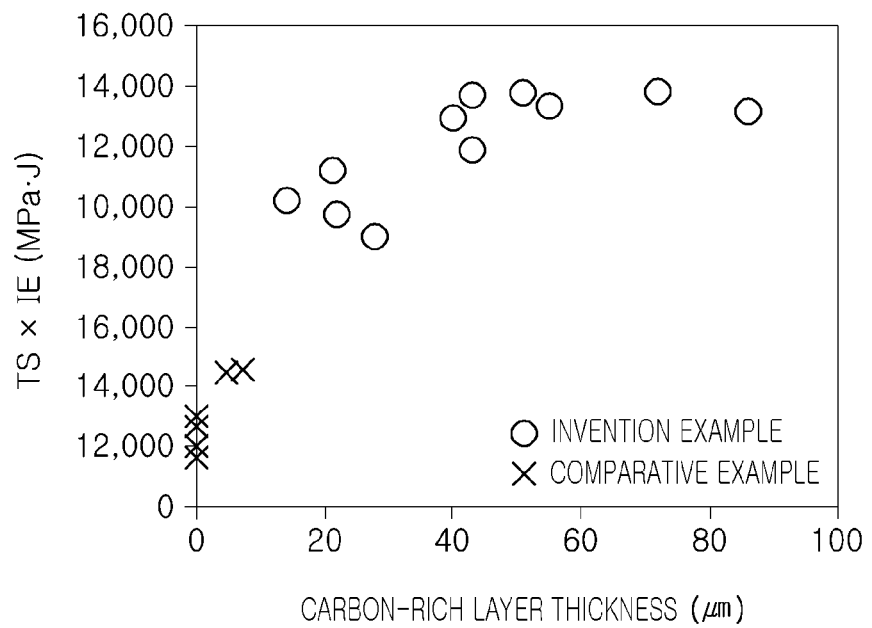
FIG. 1 is a graph illustrating TS×IE values depending on thicknesses of C thickening layers of base material surface layer parts of hot press formed parts according to an example embodiment in the present disclosure.

Hereinafter, example embodiments in the present disclosure will be described. However, the embodiments in the present disclosure may be modified to various other forms, and the scope of the present disclosure is not limited to the embodiments described below. In addition, the embodiments in the present disclosure are provided in order to more completely describe the present disclosure for those having average knowledge in the art.

The present inventors have found that a hot press formed part according to a related art has a poor impact property, and have recognized that inclusion control and grain size control for improving an impact property of a typical steel material are limited in improving a low impact property occurring in actual hot process forming. To address the issues, the present inventors conducted a profound research.

A low impact property, occurring in actual hot press forming, is caused by presence of locally formed ferrite of a surface layer part. When such ferrite is locally formed, deformation, resulting from applied impact, is concentrated on the ferrite to be easily fractured.

Such a phenomenon is significantly important in an actual component. The actual component has a complex shape and has a flat portion, being in full contact with a mold perpendicularly to a moving direction of the mold, and a wall portion being in contact with the mold horizontally to the moving direction of the mold or obliquely at a small angle. In the case of such a wall portion, a contact with the mold is insufficient depending on a component shape or phase transformation is promoted according to hot press forming to establish a condition in which ferrite is easily formed on a surface layer of a base material.

Therefore, the present inventors concluded that an impact property deterioration factor such as surface ferrite, involved in hot press forming, should be significantly reduced to manufacture a hot press forming part having excellent impact properties. To this end, the present inventors concluded that hardenability needed to be locally improved in a surface layer portion. Accordingly, the present inventor confirmed that a carbon-enriched layer was formed on a base material surface layer in the hot press forming to provide a plated steel sheet for hot press forming, a hot press formed part using the plated steel sheet for hot press forming, and a manufacturing method of thereof, having excellent impact properties. For these reasons, the inventors conceived the present invention.

Plated Steel Sheet for Hot Press Forming Having Excellent Impact Property

A plated steel sheet for hot press forming, having excellent impact properties, according to an aspect of the present disclosure will be described.

Hereinafter, a plated steel sheet for hot press forming having excellent impact properties according to one aspect of the present invention will be described in detail.

The plated steel sheet for hot press forming, having excellent impact properties, according to one aspect of the present disclosure includes a base steel sheet, comprising, by weight percent (wt %), 0.15 to 0.4% of calcium (C), 0.05 to 1.0% of silicon (Si), 0.6 to 3.0% of manganese (Mn), 0.001 to 0.05% of phosphorus (P), 0.0001 to 0.02% of sulfur (S), 0.01 to 0.1% of aluminum (Al), 0.001 to 0.02% of nitrogen (N), 0.001 to 0.01% of boron (B), 0.01 to 0.5% of chromium (Cr), 0.01 to 0.05% of titanium (Ti), and a balance of iron (Fe) and inevitable impurities, and an Al—Si plated layer disposed on a surface of the base steel sheet. A carbon-depleted layer has a thickness of 5 micrometers ($\mu$m) or less on a surface layer part of the base steel sheet (the surface layer part means a region from a surface of the base steel sheet to a depth of 200 $\mu$m, and the carbon-depleted layer means a region which the carbon content is 50% or less of an average C amount (C0) of the base steel sheet).

First, an alloy composition of commonly applied to a base steel sheet of the plated steel sheet, a base material of the hot press formed part, and a slab of a producing method, will be described in detail. Hereinafter, a unit of the content of each component will be weight percent (wt %) unless otherwise specified.

Carbon (C): 0.15 to 0.4%

Carbon (C) is an element essential to improve strength of an hot press formed part.

When a content of carbon (C) is less than 0.15%, it is difficult to secure sufficient strength. Meanwhile, when the content of carbon (C) is greater than 0.4%, strength of a hot-rolled material is so high that a cold rolling property may be significantly deteriorated during cold-rolling of the hot-rolled material, and spot weldability may be significantly reduced. Accordingly, the content of carbon (C) is, in detail, 0.15 to 0.4%.

In addition, a lower limit of the content of carbon (C) may be, in further detail, 0.18% and an upper limit of the content of carbon (C) may be, in detail, 0.35%.

Silicon (Si): 0.05 to 1.0%

Silicon (Si) needs to be added a deoxidizer and serves as a solid solution strengthening element and a carbide formation suppressing element in steel making. In addition, silicon (Si) contributes to improvement in the strength of a hot press formed part and is effective in material uniformity.

When a content of silicon (Si) is less than 0.05%, the above-mentioned effect is insufficient. Meanwhile, when the content of silicon (Si) is greater than 1.0%, aluminum (Al) platability may be significantly reduced by a silicon (Si) oxide formed on a surface of a steel sheet during annealing. Therefore, the content of silicon (Si) is, in detail, 0.05 to 1.0%.

In addition, a lower limit of the content of silicon (Si) may be, in further detail, 0.08%, and an upper limit of the content of silicon (Si) may be, in further detail, 0.9%.

Manganese (Mn): 0.6 to 3.0%

Manganese (Mn) needed to be added to secure a solid solution strengthening effect and to reduce a critical cooling rate for securing martensite in the hot press formed part.

When a content of manganese (Mn) is less than 0.6%, there is a limitation in obtaining the above effect. Meanwhile, when the content of manganese (Mn) is greater than 3.0%, a cold rolling property is reduced due to an increase in strength of a steel sheet before a hot process forming process, and the cost of a ferro-alloy is increased and spot weldability is deteriorated. Accordingly, the content of manganese (Mn) is, in detail, 0.6 to 3.0%.

In addition, a lower limit of the content of manganese (Mn) may be, in further detail, 0.8% and an upper limit of the content of manganese (Mn) may be, in further detail, 2.8%.

Phosphorus (P): 0.001 to 0.05%

Phosphorus (P) is an impurity. High manufacturing costs are incurred to control a content of phosphorus (P) to be less than 0.001%. When the content of phosphorous (P) is greater than 0.05%, weldability of the hot press formed part is significantly deteriorated. Accordingly, the content of phosphorous (P) is, in detail, 0.001 to 0.05%.

Sulfur (S): 0.0001 to 0.02%

High manufacturing costs are incurred to control the content of sulfur (S) to be less than 0.0001%. When the content of sulfur (S) is greater than 0.02%, ductility, an impact property, and weldability of the hot press formed part are deteriorated. Accordingly, the content of sulfur (S) is, in detail, 0.0001 to 0.02%.

Aluminum (Al): 0.01 to 0.1%

Aluminum (Al) is an element performing a deoxidation action together with silicon (Si) in steelmaking to improve cleanliness of steel.

When a content of aluminum (Al) is less than 0.01%, the above-mentioned effect is insufficient. When the content of aluminum (Al) is greater than 0.1%, high-temperature ductility is reduced due to an excessive aluminum nitride (AlN) formed during a continuous casting process, and slab cracking is apt occur.

Nitrogen (N): 0.001 to 0.02%

Nitrogen (N) is included in the steel as an impurity. High manufacturing costs are incurred to control a content of nitrogen (N) to be less than 0.001%. When the content of nitrogen (N) is greater than 0.02%, high-temperature ductility is reduced due to an excessive aluminum nitride (AlN) formed during a continuous casting process, and slab cracking is apt to occur.

Boron (B): 0.001 to 0.01%

Boron (B) is an element which may improve hardenability even if a small amount of boron (B) is added, and is an element which may segregate along prior-austenite grain boundaries to suppress embrittlement of a hot press formed part caused by boundary segregation of phosphorus (P) and/or sulfur (S). However, when the content of boron (B) is less than 0.0001%, it is difficult to obtain such an effect. When the content of boron (B) is greater than 0.01%, such an effect may be saturated and may result in brittleness at hot rolling.

Chromium (Cr): 0.01 to 0.5%

Chromium (Cr) is added to secure the hardenability of the steel such as manganese (Mn), boron (B), or the like.

When a content of chromium (Cr) is less than 0.01%, it is difficult to secure sufficient hardenability. When the content of chromium (Cr) is greater than 0.5%, the hardenability may be sufficiently secured, but characteristics thereof may be saturated and steel sheet producing costs may be increased.

Titanium (Ti): 0.01 to 0.05%

Ti is added in order to retain the solidified boron (B) which is essential for securing the hardenability. This is because Ti is combined with nitrogen remained in the steel as an impurity to form TiN.

When a content of titanium (Ti) is less than 0.01%, the above-mentioned effect is insufficient. When the content of titanium (Ti) is greater than 0.05%, the characteristics may be saturated and steel sheet producing costs may be increased.

In the present disclosure, the other component is iron (Fe). However, impurities in raw materials or manufacturing environments may be inevitably included, and such impurities may not be excluded. Since such impurities are well to a person of ordinary skill in manufacturing industries, descriptions thereof will not be given in the present disclosure.

In addition to the above-described alloy composition, at least one selected from molybdenum (Mo), niobium (Nb), and vanadium (V) may be additionally contained in such a manner that a total amount is set to be 0.01 to 0.5 wt %.

Mo, Nb and V are elements contributing to improvement in strength and increase in impact toughness caused by grain refinement. When the total amount thereof is less than 0.01%, the above-mentioned effect may not be obtained. When the total amount is greater than 0.5%, the effect may be saturated and the manufacturing costs may be increased.

In the plated steel sheet for hot press forming according to the present disclosure, a thickness of a carbon-depleted layer is 5 micrometers (μm) or less on a surface layer part of a base steel sheet. The surface layer part means a region from the surface of the base steel sheet to a depth of 200 μm, and the carbon-depleted layer means a region which the carbon content is 50% or less of an average C amount (C0) of the base steel sheet.

When the thickness of the carbon-depleted layer in the surface layer part of the base steel sheet is greater than 5 μm, it is difficult to sufficiently form the carbon-enriched layer in the surface layer part of the base material after the final hot press forming. Therefore, the thickness of the carbon-depleted layer may be, in detail, 5 μm or less and, in further detail, 4 μm or less.

In the base steel sheet, a ratio of a carbide fraction of the surface layer part (Fs) to a carbide fraction of a central portion (Fc) (Fs/Fc) may be 0.7 to 1.3. The surface layer part means a region from the surface of the base steel sheet to a depth of 200 μm, and the central portion means a region having a thickness of −100 μm to +100 μm from a thickness center of the base steel sheet.

A carbide, present in the base steel sheet, is dissolved during hot press forming to supply carbon. When the ratio Fs/Fc is less than 0.7, it is difficult to sufficiently form a carbon-enriched layer on a surface layer of the base material during the hot press forming. Meanwhile, when the Fs/Fc is greater than 1.3, the carbon-enriched layer may be sufficiently formed. However, before annealing, a special treatment such as a carburizing treatment is required to control the Fs/Fc to be greater than 1.3. Moreover, manufacturing costs is increased.

A microstructure of the base steel sheet is not limited, but may include, by an area fraction, for example, 10 to 40% of pearlite, 50 to 90% of ferrite, and 20% or less of martensite.

The plated steel sheet for hot process forming according to the present disclosure comprises an Al—Si plated layer formed on the surface of the base steel sheet. The Al—Si plated layer suppresses surface decarburization during hot press forming and serves to improve corrosion resistance.

The plated layer may contain, by weight percent (wt %), 6 to 12% of silicon (Si), 1 to 4% of iron (Fe), and a balance of aluminum (Al) and inevitable impurities. This is because a composition of a galvanizing bath is not limited but needs to be controlled, as set forth below. A plated layer, having a composition nearly the same as the composition of the plating bath, is formed and has a higher content of iron (Fe) than the plating bath, but satisfies the above range.

When a content of silicon (Si) is less than 6%, fluidity of the plating bath is reduced to makes it difficult to uniformly form a plated layer. On the other hand, when the content of silicon (Si) is greater than 12%, a melting temperature of the plating bath is increased, and thus a management temperature of the plating bath should be increased. Iron (Fe) in the plating bath is dissolved to be present in the plating bath from the steel sheet during a plating process. In order to maintain a content of iron (Fe) in the galvanizing bath at less than 1%, excessive manufacturing costs are incurred to dilute iron (Fe) dissolved and discharged. When the content of iron (Fe) is greater than 4%, an aluminum iron (FeAl) compound, dross, is apt to be formed in the plating bath to degrade plating quality. Therefore, the content of iron (Fe) needs to be controlled at 4% or less.

The plated layer may have a thickness of 10 to 45 μm.

When the plated layer has a thickness less than 10 μm, it is difficult to secure the corrosion resistance of the hot press formed part. When the plated layer has a thickness greater than 45 μm, the manufacturing costs may be increased due to excessive plating adhesion amount, and it may be difficult to uniformly plate the steel sheet in width and length direction a coil.

Manufacturing Method of Plated Steel Sheet for Hot Press Forming Having Excellent Impact Property Hereinafter, a manufacturing method of a plated steel sheet for hot press forming having excellent impact properties, another aspect of the present disclosure, will be described in detail.

The manufacturing method comprises heating a slab, satisfying the above-mentioned alloy composition, to a temperature of 1050 to 1300° C., performing finishing hot-rolling on the heated slab to a temperature of 800 to 950° C. to obtain a hot-rolled steel sheet, stating cooling the hot-rolled steel sheet within 30 seconds of performing the finishing hot-rolling and winding the hot-rolled steel sheet at a temperature of 450 to 750° C., heating the wound hot-rolled steel sheet to a temperature of 740 to 860° C. to be annealed in an atmosphere having a dew point temperature of −70 to −30° C., and plating the annealed hot-rolled steel sheet by dipping in an aluminum-silicon (Al—Si) plating bath.

Slab Heating

The slab, satisfying the above-mentioned alloy composition, is heated to 1050 to 1300° C.

When a slab heating temperature is lower than 1050° C., it may be difficult to homogenize a slab structure. When the slab heating temperature is higher than 1300° C., an excessive oxidation layer is formed and a surface layer part is severely decarburized during heating. Therefore, it is difficult to form a carbon-enriched layer on the surface layer part of a base material during ultimate hot press forming, as intended in the present disclosure.

Hot-Rolling

The heated slab is hot-rolled at 800 to 950° C. to obtain a hot-rolled steel sheet.

When a finishing hot-rolling temperature is lower than 800° C., it is difficult to control a plate shape, resulting from generation of a mixed grain structure in the surface layer part of the steel sheet depending on rolling at two phase regions. When the finishing hot-rolling temperature is higher than 950° C., coarse grains may be formed.

Cooling and Winding

The hot-rolled steel sheet starts to be cooled within 30 seconds of finishing hot rolling, and is wound at 450 to 750° C.

When the cooling is started over 30 seconds, surface decarburization is accelerated as high temperature maintenance time is increased, and a carbon-depleted layer is formed in the surface layer part. Even after hot press forming, such a carbon-depleted layer remains in the base material to make it difficult to form a carbon-enriched layer.

When the winding temperature is lower than 450° C., it is difficult to control a plate shape because martensite is formed in the whole or a portion of the steel sheet and a cold rolling property may be deteriorated due to an increase in strength of the hot-rolled steel sheet. Meanwhile, when the winding temperature is higher than 750° C., surface decarburization is accelerated and surface quality is degraded due to internal oxidation after subsequent plating.

Annealing

The wound hot-rolled steel sheet is heated to 740 to 860° C. and annealed in an atmosphere having a dew point temperature of −70 to −30° C.

When the annealing temperature is less than 740° C., the cold-rolled structure is insufficiently recrystallized to cause a poor plate shape or strength following plating is excessively increased to cause wear of a mold during a blanking process. On the other hand, when the annealing temperature is higher than 860° C., a surface oxide such as silicon (Si), manganese (Mn), or the like is formed during an annealing process to cause a poor Al—Si plated surface.

Additional equipment for controlling a composition of gas or the like is required to control a dew point temperature of the atmosphere to be less than −70° C., and increases manufacturing costs. When the dew point temperature is higher than −30° C., a surface of the steel sheet is decarburized during annealing to make it difficult to form a carbon-enriched layer on a surface layer after an ultimate heat treatment, as intended in the present disclosure.

In this case, the annealing process may be performed in a non-oxidizing atmosphere, for example, a hydrogen-nitrogen mixed gas may be used.

The manufacturing method may further comprise cold-rolling the wound hot-rolled steel sheet to obtain a cold-rolled steel sheet before the annealing.

Although annealing and plating may be performed without performing cold rolling, the cold rolling may be performed to more precisely control a thickness of the steel sheet. The cold rolling may be performed at a reduction ratio of 30 to 80%.

Plating

The wound hot-rolled steel sheet is plated by dipping in an Al—Si plating bath. When the cold rolling and the annealing are performed, the annealed cold-rolled steel sheet is plated by dipping in the Al—Si plating bath.

In this case, the Al—Si plating bath may comprise, by weight percent (wt %), 6 to 12% of silicon (Si), 1 to 4% of iron (Fe), and a balance of aluminum (Al) and inevitable impurities.

When a content of silicon (Si) is less than 6%, fluidity of the plating bath is reduced to make it difficult to form a uniform plated layer. On the other hand, when the content of silicon (Si) is greater than 12%, the melting temperature of the plating bath is increased, and thus the plating bath management temperature should be increased. Iron (Fe) in the plating bath is dissolved to be present in the plating bath from the steel sheet during the plating process. In order to maintain a content of iron (Fe) in the plating bath at less than 1%, excessive manufacturing costs are incurred to dilute iron (Fe) dissolved and discharged. When the content of iron (Fe) is greater than 4%, an aluminum iron (FeAl) compound, dross, is apt to be formed in the plating bath to degrade plating quality. Therefore, the content of iron (Fe) needs to be controlled at 4% or less.

The plating may be performed in such a manner that plating weight is set to be 30 to 130 g/m$^2$ on the basis of one side.

When the plating weight is less than 30 g/m$^2$ on the basis of one side, it is difficult to secure the corrosion resistance of the hot press formed part. When the plating weight is greater than 130 g/m$^2$, the manufacturing costs may be increased due to excessive plating adhesion amount, and it may be difficult to uniformly plate the steel sheet in width and length direction a coil.

Hot Press Formed Part Having Excellent Impact Property

Hereinafter, a hot press formed part having excellent impact properties, another aspect of the present invention, will be described in detail.

The hot press formed part comprises a base material, satisfying the above-described alloy composition, and an aluminum-silicon (Al—Si) plated layer formed on a surface of the base material. A carbon-enriched layer is formed on the surface layer part of the base material.

The surface layer part means a region from the surface of the base material to a depth of 200 μm, and the carbon-enriched layer means a region which the carbon content is 110% or more of an average C amount ($C_0$) of the base material.

The carbon-enriched layer is provided to improve hardenability of the surface layer part, and suppresses the formation of ferrite in the surface layer to improve the impact property.

In this case, the carbon-enriched layer may have a thickness of 10 to 150 μm.

When the thickness of the carbon-enriched layer is less than 10 μm, an effect of suppressing formation of ferrite in the surface layer part and a hardenability improving effect are insufficient. Thus, ultimately, the impact property of the hot press formed part may be deteriorated. In order to control the thickness of the carbon-enriched layer to be greater than 150 μm, a heat treatment needs to be performed for a long period of time, and additional manufacturing costs such as carburizing atmosphere control may be increased.

A microstructure of the base material is not limited. For example, the microstructure of the base material may contain, by area fraction, 90% or more of martensite or bainite as a main phase, 10% or less of ferrite, and 5% or less of residual austenite.

In this case, the hot press formed part may have tensile strength (TS) of 1300 MPa or more and impact absorption energy (IE) of 4.0 J measured using a sample having a thickness of 1.5 mm at 25° C.

The hot press formed part may have a product of tensile strength (TS) and impact absorption energy (IE), measured using a sample having a thickness of 1.5 mm at a temperature of 25° C., (TS×IE) greater than or equal to 8000 MPa·J.

Manufacturing Method of Hot Press Formed Part Having Excellent Impact Property

Hereinafter, a manufacturing method of a hot press formed part having excellent impact properties, another aspect of the present invention, will be described in detail.

The manufacturing method comprises a heating a plated steel sheet, manufactured by the above-described manufacturing method of a plated steel sheet according to the present disclosure, to a temperature ranging from an Ac3 temperature to 980° C. and maintaining for 1 to 1000 seconds, and a hot press forming the heated plated steel sheet by a press while cooling to a martensite transformation finish temperature (Mf) or less at a cooling rate of 1 to 1000° C./sec.

Heating a Plated Steel Sheet

The plated steel sheet, manufactured by the above-described manufacturing method of a plated steel sheet according to the present disclosure, is heated to a temperature ranging from an Ac3 temperature to 980° C. and maintained for 1 to 1000 seconds.

When the heating temperature is lower than the Ac3 temperature, the presence of untransformed ferrite makes it difficult to secure predetermined strength. When the heating temperature is higher than 980° C., excessive formation of an oxide on the part surface makes it difficult to secure spot weldability.

When the maintenance time is less than 1 second, the temperature may not be uniform and some carbides may be insufficiently redissolved, which may cause material differences in each portion. When the maintenance time is greater than 1000 seconds, an oxide is excessively formed on apart surface to make it difficult to secure spot weldability, similarly to the case of the higher heating temperature.

In this case, the total heating rate during heating is not limited but may be set in such a manner a heating rate of 600 to 800° C. is 1 to 10° C./sec to more easily form the carbon-enriched layer in a surface layer of the base material.

In general, the presence of an Al—Si plated layer suppresses decarburization of the base material during heating. However, the temperature ranging from 600 to 800° C. is a range in which the Al—Si plated layer is melted during heating and a liquid plated layer is present, and a continuous decarburization reaction occurs. Accordingly, when the heating rate is lower than 1° C./sec in the temperature ranging from 600 to 800° C., the continuous decarburization reaction makes it difficult to ultimately form a sufficient carbon-enriched layer in the surface layer part of the base material. When the heating rate is greater than 10° C./sec in the temperature ranging from 600 to 800° C., the continuous decarburization reaction may be significantly reduced, but additional heating equipment is required to increase the manufacturing costs.

Hot Press Forming

The manufacturing method comprises a hot press forming the heated plated steel sheet by a press while cooling to a martensite transformation finish temperature (Mf) or less at a cooling rate of 1 to 1000° C./sec.

When the cooling rate is less than 1° C./sec, ferrite is formed to make it difficult to secure high strength. In order to control the cooling rate to be higher than 1000° C./sec, expensive special cooling equipment is required to increase the manufacturing costs.

MODE FOR INVENTION

Hereinafter, example embodiments in the present disclosure will be described in detail. However, the present disclosure is not limited to the example embodiments described herein.

A slab, having a thickness of 40 mm and a composition listed in Table 1, was prepared by vacuum melting.

The slab was heated, hot rolled, cooled, and wound under the conditions, listed in Table 2, to produce a hot-rolled steel sheet having a thickness of 3 mm. A plated steel sheet was produced by pickling the hot-rolled steel sheet, cold-rolling the pickled steel sheet at a reduction ratio of 50%, annealing the cold-rolled steel sheet in an atmosphere of 5% of hydrogen and 95% of nitrogen under the conditions listed in Table 2, and plating the annealed steel sheet by dipping in a plating bath containing aluminum (Al), 9% of silicon (Si), and 2% of iron (Fe) in such manner that a plating amount is 80 g/m² on the basis of one side.

In a base steel sheet of the plated steel sheet, a thickness of a carbon-depleted layer of a surface layer part, a carbide fraction Fc of a central portion, and a surface layer carbide fraction Fs of a surface layer part carbide were observed and measured and listed Table 2. The carbon depletion layer means a region which the carbon content is 50% or less of an average C amount ($C_0$) of the base steel sheet, the surface layer part means a region which 200 μm from a surface of the base steel sheet, and the central portion means a region which is −100 μm to +100 μm from a thickness center of the base steel sheet.

In distribution analysis of carbon, concentration analysis on main elements such as carbon, and the like, was performed with respect to sufficient depth from a surface layer by using a glow discharge spectrometer (GDS) method which quantitative analyzes various components in the depth direction. In the case of a typical GDS analysis, it is difficult to precisely specify a boundary between a plated layer and a base material due to a depth profile for the depth direction because a depth-direction analysis is performed on a circular area of 2 to 6 mm. However, based on various optical and SEM analysis results, a point, at which the content of aluminum (Al) is 1%, was referenced as a base material surface layer.

A carbide of the base steel sheet was measured by an image analyzer after 1000-magnification SEM observation is performed in three locations of each of the surface layer part and the central portion.

Hot press forming was performed to manufacture a hot press formed part by heating the plated steel sheet under heating conditions listed in Table 3 and transferring the heated steel sheet to a press in which a hat-shaped mold is seated. Time, from heating furnace extraction to start of the hot press forming, was 12 seconds and equivalently applied. Samples were taken out of a wall portion which is vulnerable to formation of ferrite in an actual component, and a thickness, yield strength (YS), and tensile strength (TS), elongation (EL), and impact absorption energy (IE) of the base material surface layer part were observed and measured and listed in Table 3.

Before charging into the heating furnace, a thermocouple was attached to a central portion of a blank to measure heating behaviors of a steel sheet. Then, a heating rate in a temperature section of 600 to 800° C. was measured based on the heating behaviors.

The carbon thickening layer means a region which the carbon content is 110% or more of an average C amount ($C_0$) of the base material, and the thickness of the carbon-enriched layer in the base material surface layer was measured using GDS analysis, which is the same method as analysis of the carbon-depleted layer.

A Charpy impact toughness test was performed to evaluate an impact property. In the present disclosure, each of the steel sheets was a thin material having a thickness of 1.5 mm, and it was difficult to prepare a Charpy impact toughness sample having a standard size. Therefore, in each test, a V-notch type sample, having only a size reduced to 1.5 mm compared with the standard size, was prepared and evaluated at a room temperature (25° C.), and impact energy (IE) was measured. Since a typical impact property is inversely proportional to strength, the impact property was expressed together with a result converted into TS×IE. Classification was made based on the result of TS×IE to confirm excellent impact properties intended in the present disclosure.

TABLE 1

| Note | Type of Steel | C | Si | Mn | P | S | Al | N | B | Cr | Ti | Other |
|---|---|---|---|---|---|---|---|---|---|---|---|---|
| IS | A | 0.23 | 0.2 | 1.3 | 0.01 | 0.002 | 0.03 | 0.004 | 0.0025 | 0.21 | 0.035 | |
| IS | B | 0.31 | 0.5 | 1 | 0.009 | 0.001 | 0.028 | 0.0043 | 0.0027 | 0.4 | 0.032 | |
| IS | C | 0.18 | 0.8 | 2.5 | 0.011 | 0.003 | 0.031 | 0.0038 | 0.0022 | 0.15 | 0.037 | |
| IS | D | 0.25 | 0.1 | 1.1 | 0.009 | 0.002 | 0.029 | 0.0045 | 0.0024 | 0.2 | 0.032 | Mo: 0.1 |
| IS | E | 0.25 | 0.1 | 1.13 | 0.009 | 0.002 | 0.032 | 0.003 | 0.0023 | 0.19 | 0.025 | Nb: 0.06 V: 0.1 |
| CS | F | 0.12 | 0.2 | 1.5 | 0.011 | 0.002 | 0.03 | 0.005 | 0.0025 | 0.22 | 0.033 | |

*IS: Inventive Steel
*CS: Comparative Steel

TABLE 2

| Plated Steel Sheet | Type of Steel | Slab Heating Temperature (° C.) | Finshing Rolling Temperature (° C.) | Cooling Starting (Sec) | Winding Temperature (° C.) | Annealing Condition | | Thickness opf Carbon-Depleted Layer (μm) | Carbide | | |
|---|---|---|---|---|---|---|---|---|---|---|---|
| | | | | | | Heating Temperature (° C.) | Dew Point Temperature (° C.) | | Fs | Fc | Fs/Fc |
| A1 | A | 1200 | 880 | 10 | 600 | 780 | −50 | 0 | 16.4 | 18.1 | 0.9 |
| A2 | | 1200 | 900 | 10 | 650 | 780 | 0 | 22 | 11.4 | 19.3 | 0.59 |
| A3 | | 1200 | 900 | 10 | 650 | 780 | −20 | 4 | 11.3 | 18.6 | 0.61 |
| A4 | | 1370 | 900 | 10 | 650 | 780 | −45 | 12 | 12.8 | 17.8 | 0.72 |
| A5 | | 1200 | 880 | 45 | 600 | 820 | −45 | 7 | 12.5 | 18.4 | 0.68 |

TABLE 2-continued

| | | Slab Heating Temperature | Finishing Rolling Temperature | Cooling Starting | Winding Temperature | Annealing Condition | | Thickness opf Carbon-Depleted | Carbide | | |
| | | | | | | Heating Temperature | Dew Point Temperature | | | | |
| Plated Steel Sheet | Type of Steel | (° C.) | (° C.) | (Sec) | (° C.) | (° C.) | (° C.) | Layer (μm) | Fs | Fc | Fs/Fc |
|---|---|---|---|---|---|---|---|---|---|---|---|
| B1 | B | 1200 | 880 | 10 | 600 | 780 | −40 | 0 | 31.6 | 36.7 | 0.86 |
| C1 | C | 1250 | 900 | 5 | 500 | 800 | −55 | 0 | 16.5 | 15.4 | 1.07 |
| C2 | | 1250 | 900 | 5 | 500 | 800 | −35 | 3 | 15.2 | 16.7 | 0.91 |
| D1 | D | 1300 | 920 | 10 | 550 | 760 | −40 | 0 | 21.3 | 19.2 | 1.11 |
| E1 | E | 1300 | 920 | 10 | 550 | 760 | −40 | 0 | 21.9 | 20.9 | 1.05 |
| F1 | F | 1200 | 880 | 10 | 600 | 780 | −50 | 0 | 13.2 | 13.8 | 0.96 |

TABLE 3

| Hot Press Molding Member | Plated Steel Sheet | Heating condition | | | Thickness of Carbon-enriched layer (μm) | Mechanical Properties | | | | | Note |
| | | Heating Temperature (° C.) | Maintenance Time (Min) | Heating Rate (° C./S) | | YS (MPa) | TS (MPa) | EL (%) | IE (J) | TS × IE (MPa · J) | |
|---|---|---|---|---|---|---|---|---|---|---|---|
| A1-1 | A1 | 900 | 6 | 3 | 40 | 1065 | 1499 | 6 | 8.6 | 12895 | IE |
| A1-2 | | 930 | 8 | 3.4 | 72 | 1032 | 1481 | 7 | 9.3 | 13771 | IE |
| A1-3 | | 930 | 3 | 3.4 | 51 | 1062 | 1498 | 7 | 9.2 | 13785 | IE |
| A1-4 | | 900 | 6 | 2 | 21 | 1053 | 1489 | 6 | 7.5 | 11165 | IE |
| A1-5 | | 900 | 6 | 0.5 | 7.2 | 1028 | 1465 | 7 | 3.1 | 4542 | CE |
| A2-1 | A2 | 900 | 6 | 3 | 0 | 983 | 1361 | 7 | 1.2 | 1633 | CE |
| A3-1 | A3 | 900 | 6 | 3 | 0 | 991 | 1399 | 7 | 1.9 | 2659 | CE |
| A4-1 | A4 | 910 | 5 | 3.1 | 0 | 998 | 1391 | 6 | 1.4 | 1947 | CE |
| A5-1 | A5 | 910 | 5 | 3.1 | 0 | 1002 | 1395 | 7 | 2.1 | 2929 | CE |
| B1-1 | B1 | 850 | 5 | 2.6 | 14 | 1250 | 1821 | 6 | 5.6 | 10198 | IE |
| B1-2 | | 880 | 5 | 2.9 | 22 | 1281 | 1837 | 5 | 5.3 | 9736 | IE |
| B1-3 | | 900 | 5 | 4.5 | 28 | 1285 | 1842 | 5 | 4.9 | 9026 | IE |
| C1-1 | C1 | 900 | 6 | 3 | 43 | 971 | 1351 | 8 | 8.8 | 11889 | IE |
| C1-2 | | 950 | 8 | 8.5 | 86 | 957 | 1329 | 8 | 9.9 | 13157 | IE |
| C2-1 | C2 | 850 | 3 | 0.4 | 4.7 | 954 | 1312 | 8 | 3.4 | 4461 | CE |
| D1-1 | D1 | 900 | 6 | 5 | 43 | 1144 | 1577 | 6 | 8.7 | 13720 | IE |
| E1-1 | E1 | 900 | 6 | 5 | 55 | 1151 | 1569 | 6 | 8.5 | 13337 | IE |
| F1-1 | F1 | 900 | 6 | 3 | 34 | 851 | 1208 | 8 | 10.3 | 12442 | CE |

*IE: Invention example
*CE: Comparative Example

In the case of the invention examples satisfying conditions of the present disclosure, excellent tensile strength and impact properties could be secured.

Meanwhile, in the case of plated steel sheets A2 and A3 in which dew point temperatures of an atmosphere during annealing were out of the range proposed in the present disclosure, a depth of a carbon-depleted layer was greater than 5 μm or Fs/Fc is less than 0.7 according to surface decarburization during the annealing. In hot press formed parts A2-1 and A3-1, manufactured using such characteristics, a carbon-enriched layer of a base material surface layer part had a thickness less than 10 μm, and impact properties were deteriorated.

In the case of a plated steel sheet A4, a slab heating temperature was out of the range proposed in the present disclosure. In the case of a plated steel sheet A5, a cooling start time following finishing rolling was out of the range of the present disclosure. In each of the plated steel sheets A4 and A4, a carbon-depleted layer had a depth of 5 μm or Fs/Fc was less than 0.7. In hot press formed parts A4-1 and A5-1, manufactured using such characteristics, a carbon-enriched layer of a base material surface layer part was not formed, and impact properties were deteriorated.

In hot press forming parts A1-5 and C2-1 were manufactured using plated steel sheets A1 and C2 satisfying the conditions proposed in the present disclosure, a heating rate in a temperature section of 600 to 800° C. was 1° C./sec, which was out of the range proposed in the present disclosure. In each of hot press forming parts A1-5 and C2-1, a carbon-enriched layer of a base material surface layer part was insufficiently formed to have a thickness of 10 μm or less, and an impact property was deteriorated.

In the case of a steel F, a content of carbon (C) was low. It can be seen that a hot press formed part F1-1 had deteriorated tensile strength.

FIG. 1 is a graph illustrating TS×IE values depending on thicknesses of C thickening layers of base material surface layer parts of hot press molding members according to an example embodiment in the present disclosure. From the graph in FIG. 1, it can be seen that the TS×IE value was significantly increased when the carbon-enriched layer had a thickness of 10 μm or more.

Figure 2:
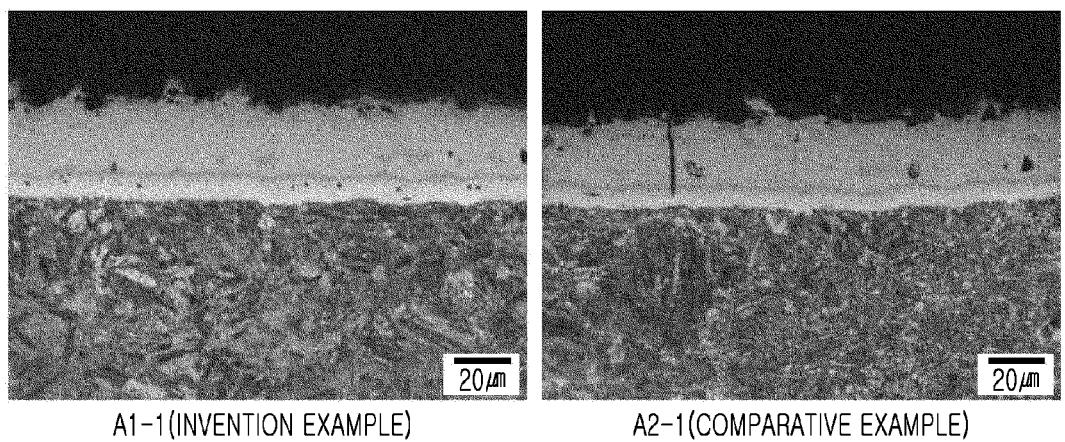
FIG. 2 is images obtained by capturing microstructures after performing initial etching on wall portions of hot press formed parts A1-1 (invention example) and A2-1 (comparative example) among examples.

FIG. 2 is images obtained by capturing microstructures after performing nital etching on wall portions of hot press formed parts A1-1 (invention example) and A2-1 (comparative example) among examples. From the images in FIG. 2, it can be seen that formation of ferrite is suppressed well in the hot press formed part A1-1 in which a carbon-enriched layer was formed in abase material surface layer part, while ferrite, deteriorating an impact property, was formed in the hot press formed part A2-1 in which a carbon-enriched layer was not formed in a base material surface layer part.

Figure 3:
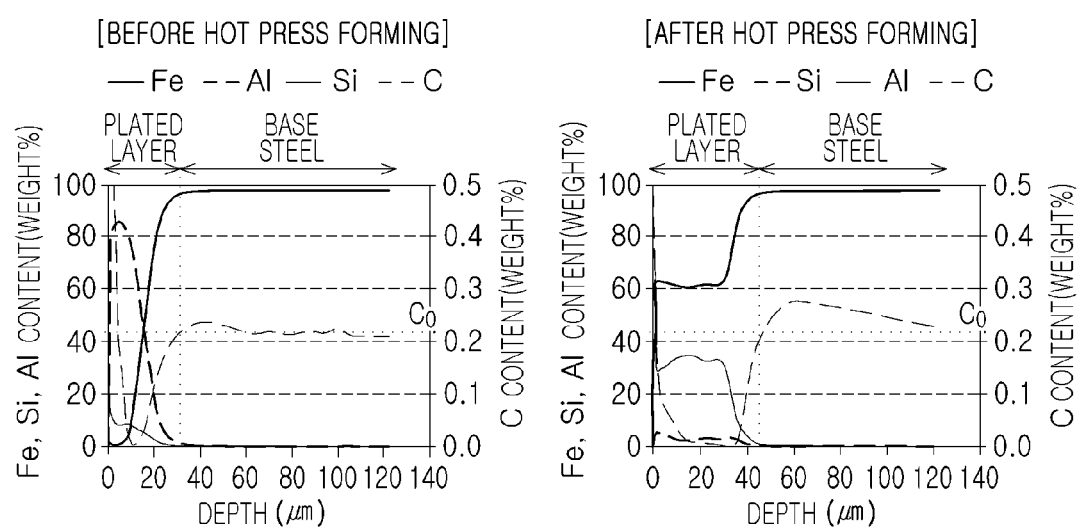
FIG. 3 is graphs illustrating concentration profiles of main components through GDS analysis before and after hot press forming of A1-1 (invention example).

FIG. 3 is graphs illustrating concentration profiles of main components through GDS analysis before and after hot press forming of A1-1 (invention example). From the graphs in FIG. 1, it can be seen that a carbon-depleted layer was not formed in a base material surface layer part before hot press forming, while a carbon-enriched layer, having a thickness of about 40 μm, was formed in a base material surface layer part after hot press forming.

While examples embodiments in the present disclosure have been described in detail, however, claims of the present disclosure are not limited thereto, and it will be apparent to those skilled in the art that various modifications and changes may be made without departing from the technological ideas of the present disclosure described in the claims.

The invention claimed is:

1. A hot press formed part, having an excellent impact property, comprising:
  a base material comprising, by wt %, 0.15-0.4% of C, 0.1-1.0% of Si, 0.6-3.0% of Mn, 0.001-0.05% of P, 0.0001-0.02% of S, 0.01-0.1% of Al, 0.001-0.02% of N, 0.001-0.01% of B, 0.01-0.5% of Cr, 0.01-0.05% of Ti, and the balance of Fe and inevitable impurities; and
  an Al—Si plated layer formed on a surface of the base material,
  wherein a carbon-enriched layer is formed in a surface layer part of the base material, and
  wherein the surface layer part means a region from the surface of the base material to a depth of 200 μm, and the carbon-enriched layer means a region which the carbon content is 110% or more of an average carbon amount ($C_O$) of the base material.

2. The hot press formed part of claim 1, wherein the carbon-enriched layer has a thickness of 10 to 150 μm.

3. The hot press formed part of claim 1, wherein the base material further comprises at least one selected from Mo, Nb, and V in such a manner that a sum thereof is 0.05 to 0.5 wt %.

4. The hot press formed part of claim 1, wherein the base material has a microstructure comprising, by area fraction, 90% or more of martensite or bainite as a main phase, 10% or less of ferrite, and 5% or less of residual austenite.

5. The hot press formed part of claim 1, which has tensile strength (TS) of 1300 MPa or more and impact absorption energy (IE) of 4.0 J or more measured using a sample having a thickness of 1.5 mm at 25° C.

6. The hot press formed part of claim 1, which has a product (TS×IE) of tensile strength (TS) and impact absorption energy (IE), measured using a sample having a thickness of 1.5 mm at 25° C., greater than or equal to 8000 MPa·J.

* * * * *